Sept. 16, 1952      A. V. HOLLENBERG      2,611,103
STANDING WAVE RATIO INDICATOR
Filed Jan. 17, 1946
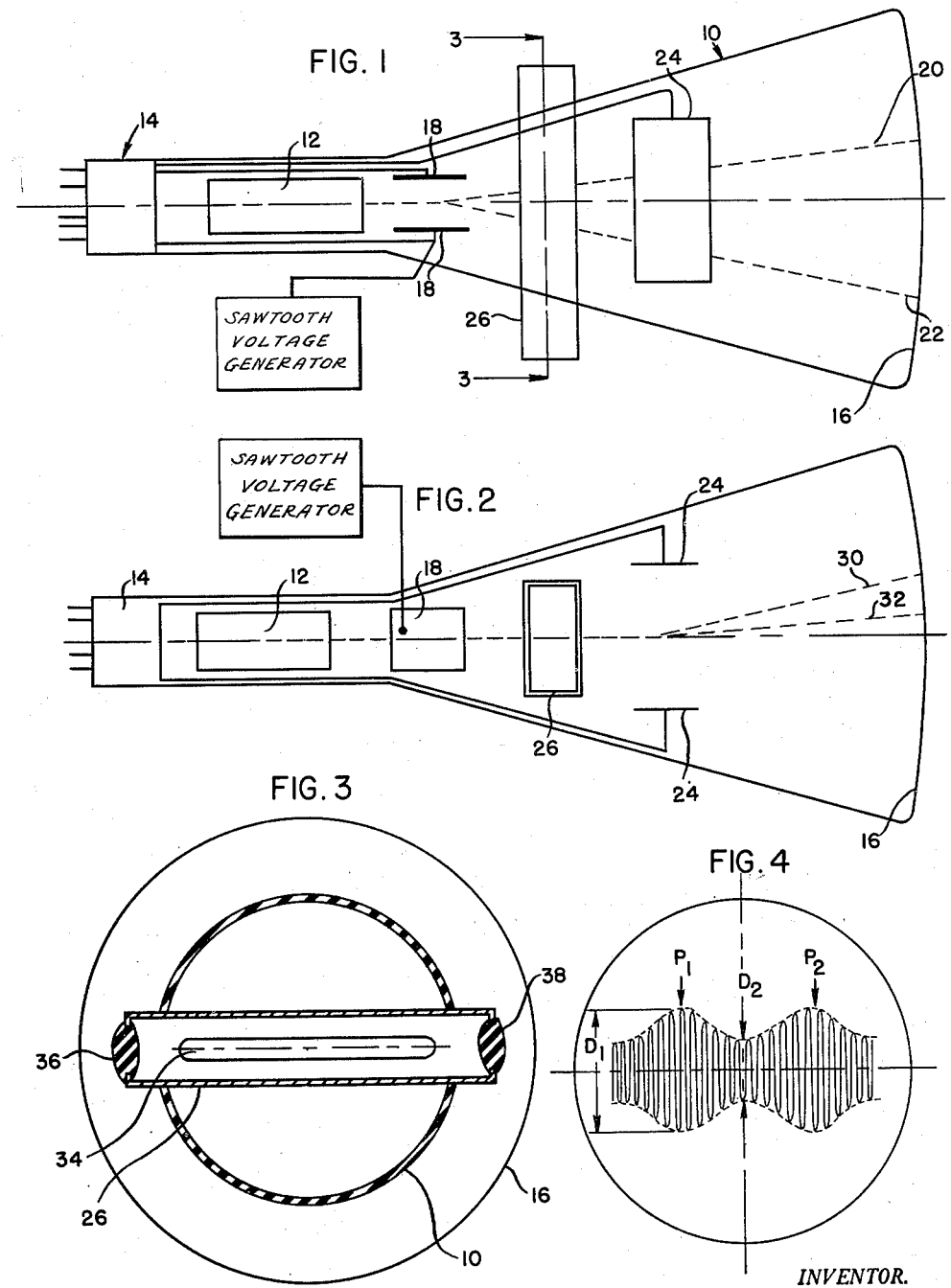
INVENTOR.
ARTHUR V. HOLLENBERG
BY
William D. Hall.
ATTORNEY Patented Sept. 16, 1952

2,611,103

UNITED STATES PATENT OFFICE 2,611,103

STANDING WAVE RATIO INDICATOR

Arthur V. Hollenberg, St. Albans, N. Y., assignor to the United States of America as represented by the Secretary of War Application January 17, 1946, Serial No. 641,835

2 Claims. (Cl. 315—3)

This invention relates to measuring devices and more particularly to electrical apparatus for measuring the standing wave ratio in radio frequency transmission lines.

A conventional means for measuring the standing wave ratio in radio frequency transmission lines employs a probe placed in a slot in a length of wave guide which is adapted to be inserted in series with the transmission line. The probe is moved along the slot in the wave guide thereby enabling the potential at various points to be measured and recorded. A graph may then be plotted of the potentials existing at points along the wave guide against their displacement from a fixed reference point. This method is laborious and time consuming. In addition, the equipment employed must be carefully machined and adjusted if satisfactory results are to be obtained.

It is an object of this invention, therefore, to provide a novel means for measuring the standing wave ratio in a transmission line, that eliminates many of the difficulties encountered in previous measuring methods.

It is a further object of this invention to provide means for producing a continuous representation of the standing waves present in a transmission line.

For a better understanding of the invention, together with other and further objects thereof, reference is had to the following description taken in connection with the accompanying drawing in which:

Fig. 1 is a diagrammatic plan view of the present invention;

Fig. 2 is a diagrammatic side view of the present invention;

Fig. 3 is a cross-sectional view of the present invention taken along the line 3—3 of Fig. 1; and Fig. 4 is a front view illustrating a typical pattern upon the viewing screen of this invention.

In Fig. 1 there is shown a cathode ray tube 10 with a conventional electron gun 12, tube base 14 and a fluorescent screen 16. In the embodiment here illustrated, a pair of deflecting plates 18 are provided so that suitable potentials applied thereto may deflect the electron beam in a predetermined manner. The deflection or sweeping action of the beam is preferably produced by applying a sawtooth waveform voltage to the plates 18. Dotted lines 20 and 22 illustrate two of the many paths taken by the electron beam during the sweeping action. A second pair of deflecting plates 24 are so oriented that an electric field therebetween deflects the beam in a direction at right angles to the plane of deflections produced by potentials applied to plates 18. A metallic hollow-pipe wave guide 26 positioned between deflecting plates 18 and 24 is provided with aligned slots located in the plane of deflection of plates 18. Wave guide 26 passes through the glass envelope of cathode ray tube 10 and is provided at each end with a matched window sealed to the wave guide. A glass to metal seal is made at the points that wave guide 26 passes through the glass envelope of tube 10.

A diagrammatic side view of the embodiment shown in Fig. 1 is given in Fig. 2, in which like parts have been given like reference numerals. Dotted lines 30 and 32 represent two of the many paths that the electron beam may follow after deflection by plates 24. In the cross-sectional view of the invention, as shown in Fig. 3, are best seen the previously mentioned aligned slots, here designated by the reference numeral 34, and the matching windows 36 and 38 at the two ends of wave guide 26.

Referring now more particularly to the operation of the present invention, cathode ray tube 10 may be connected in a circuit that is similar to a cathode ray oscilloscope circuit, except as to wave guide 26 and deflecting plates 24, as will appear. The electron beam is focused and accelerated by electron gun 12, and the beam is made to sweep back and forth through the aligned slots 34 by means of a relatively low frequency potential applied to plates 18. Wave guide 26 is, by means of windows 36 and 38, matched into a transmission line whose standing wave characteristics are to be determined. If necessary, additional matching sections may be inserted between the ends of wave guide 26 and the transmission line under test so that the electrical characteristics of the line under test are not changed. The standing wave conditions of the line are thus duplicated within wave guide 26. The electron beam in tube 10 passes through the two slots in wave guide 26 in directions substantially parallel to the directions of the electric field within this wave guide. As the electron beam is swept back and forth through the slots in wave guide 26, the velocity of the beam is continually changed by amounts proportional to the intensities and directions of the rapidly varying electric field in wave guide 26 at the points of passage of the electron beam. The instantaneous magnitude of the change in velocity along a beam path varies sinusoidally with time in accordance with the variation of the electric field in wave guide 26, but the limits of change in the beam velocity along any one beam path remains constant. For example, along the path 20 shown in Fig. 1, the range of velocities with which the electron beam leaves wave guide 26 may be smaller than the range of velocities with which the electron beam leaves along the path 22, due to standing wave conditions in wave guide 26. It is to be understood that the variations in direction and intensity of the electric field at any one point within wave guide 26 are rapid relative to the sweeping action of the beam.

The electron beam leaving wave guide 26 passes between deflecting plates 24. In the cathode ray tube here described, a constant potential difference is maintained between plates 24, and the electron beam passing between the plates is thus deflected by amounts inversely proportional to the square of the beam velocities. This latter deflection is at right angles to the deflection of the electron beam caused by plates 18. Two such deflection paths caused by plates 24 are illustrated in Fig. 2 at 30 and 32. The electron beam upon striking screen 16 traces a pattern that is indicative of the standing wave conditions within wave guide 26 and the transmission line to which it is connected.

Fig. 4 illustrates the appearance of such a pattern upon screen 16 delineating standing wave conditions in a transmission line. The envelope of the pattern may actually contain many more cycles of oscillation traces than appear in Fig. 4, for the frequency of the wave energy within the wave guide 26 may be extremely high compared to the lateral sweep rate of the electron beam. The pattern within the envelope may further not be stationary, for such a condition obtains only at certain ratios of sweep frequency to wave guide energy frequency. The determination of the standing wave ratio is determined by measurements made upon the envelope itself, for this envelope corresponds to the standing wave. The standing wave ratio is thus given by the ratio of distance $D_1$ to distance $D_2$ as designated in Fig. 4, and the cathode ray tube 10 may be provided with means for measuring these distances. The apparatus may further be calibrated to indicate the guide wavelength of the guide energy, for it is proportional to the distance between corresponding positions along the pattern envelope, for example, the positions $P_1$ and $P_2$ shown in Fig. 4.

It is apparent that further advantages of the invention here described are that: the standing wave ratio in a transmission line may be determined by direct measurements upon a representative pattern; a "picture" of the standing wave in a transmission line appears on the screen of this invention thus providing instantaneous data and facilitating adjustment of associated apparatus; and there are no moving parts in this invention, so that careful adjustment and special techniques necessary with prior art devices for measuring standing wave ratios are eliminated.

While there has been described what is at present considered the preferred embodiment of the invention, it will be obvious to those skilled in the art that various changes and modifications may be made therein without departing from the spirit of the invention.

What is claimed is:

1. A standing wave ratio indicator, comprising an electron discharge device including an electron gun generating a beam of electrons along a first coordinate, first deflection means for periodically deflecting said beam along a second coordinate perpendicular to said first coordinate, an electromagnetic wave transmission means providing a standing wave pattern in the path of said periodically deflected beam and having an elongated aperture, the long dimension of said aperture being parallel to said second coordinate, and said aperture being positioned to permit passage of said periodically deflected electron beam through said means, whereby the electrons in said periodically deflected beam may be velocity modulated in accordance with said standing wave pattern, second deflection means providing a constant deflection field for deflecting said beam along a third coordinate perpendicular to both said first and second coordinates, said second deflection means being disposed along said beam, said transmission means being disposed between said first and second deflection means, and a fluorescent screen disposed in the path of said beam after it has passed through both said deflection means.

2. The indicator as set forth in claim 1, wherein said transmission means comprises a length of rectangular waveguide having broad and narrow walls with aligned elongated slots in the broad walls thereof, the long axes of said slots being parallel to said second coordinate, and said slots being positioned so as to permit passage of said periodically deflected beam of electrons therethrough.

ARTHUR V. HOLLENBERG.

REFERENCES CITED

The following references are of record in the file of this patent:

UNITED STATES PATENTS

| Number | Name | Date |
|---|---|---|
| 2,288,694 | Fry | July 7, 1942 |
| 2,289,770 | Fremlin | July 14, 1942 |
| 2,368,031 | Llewellyn | Jan. 23, 1945 |
| 2,368,328 | Rosencrans | Jan. 30, 1945 |
| 2,408,216 | Kilgore | Sept. 24, 1946 |
| 2,450,618 | Smullin et al. | Oct. 5, 1948 |